Figure 1:
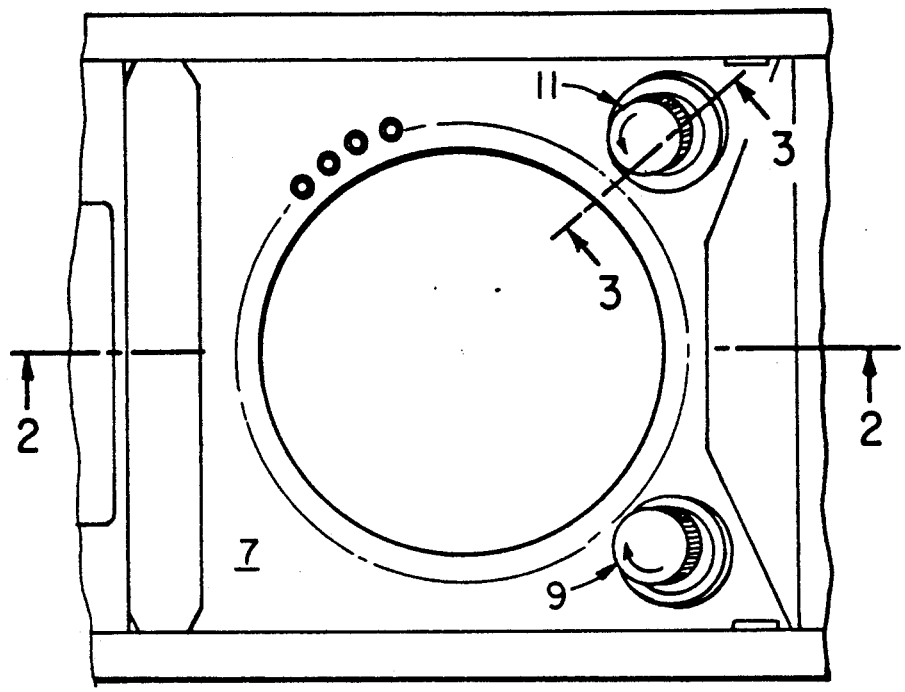

United States Patent [19]

Nielsen et al.

[11] Patent Number: 5,035,575
[45] Date of Patent: Jul. 30, 1991

[54] YAWING SYSTEM FOR A WIND MILL

[75] Inventors: Erik Nielsen, Odense; Erland F. Hansen, Morke, both of Denmark

[73] Assignee: I.K. Trading Aps., Odense SV, Denmark

[21] Appl. No.: 406,101

[22] Filed: Sep. 12, 1989

Related U.S. Application Data

[63] Continuation-in-part of Ser. No. 150,770, Feb. 1, 1988, Pat. No. 4,966,525.

[51] Int. Cl.⁵ .............................................. F03D 7/04
[52] U.S. Cl. ......................................... 416/9; 416/14; 416/169 R
[58] Field of Search ............... 416/4, 9, 11, 14, 169 R, 416/170 A, DIG. 6; 290/44, 55; 318/373, 374, 375

[56] References Cited

U.S. PATENT DOCUMENTS

| | | | |
|---|---|---|---|
| 4,527,072 | 7/1985 | van Degeer | 416/DIG. 6 |
| 4,557,666 | 12/1985 | Baskin et al. | 416/11 |
| 4,966,525 | 10/1990 | Nielson | 416/9 |

FOREIGN PATENT DOCUMENTS

EP83819  7/1983  European Pat. Off. .............. 416/13

Primary Examiner—John T. Kwon
Attorney, Agent, or Firm—Darby & Darby

[57] ABSTRACT

A yawing system for a wind mill consists of two yawing motors (9, 11) acting on a toothed rim of the yawing bearing. On each its drive shaft (21) the motors (9, 11) are provided with a free wheel (23) and an electromagnetic friction brake (25). The free wheel devices (23) are directed opposite each other. A control system operates in a passive state in such a manner that the motors give opposite and relative to the braking moment of the brake (25) of a second motor smaller torque thereby avoiding dead clearance between drive wheel (15) and toothed rim (17) while at the same time keeping the generator housing (5) of the mill at rest. In the active state of the control system both brakes (25) are disengaged and both motors give a higher torque in the same direction. The system acts as a shock absorber by loads exceeding the fixed slip moment of the friction brake (25).

4 Claims, 2 Drawing Sheets

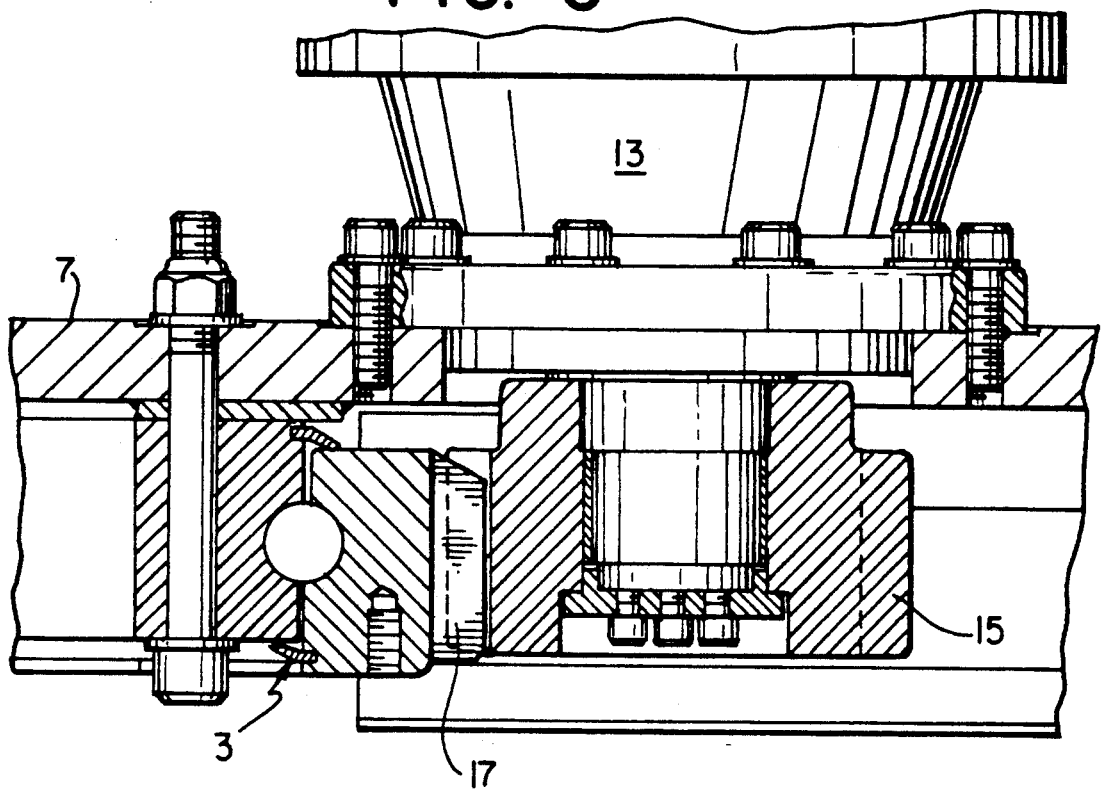
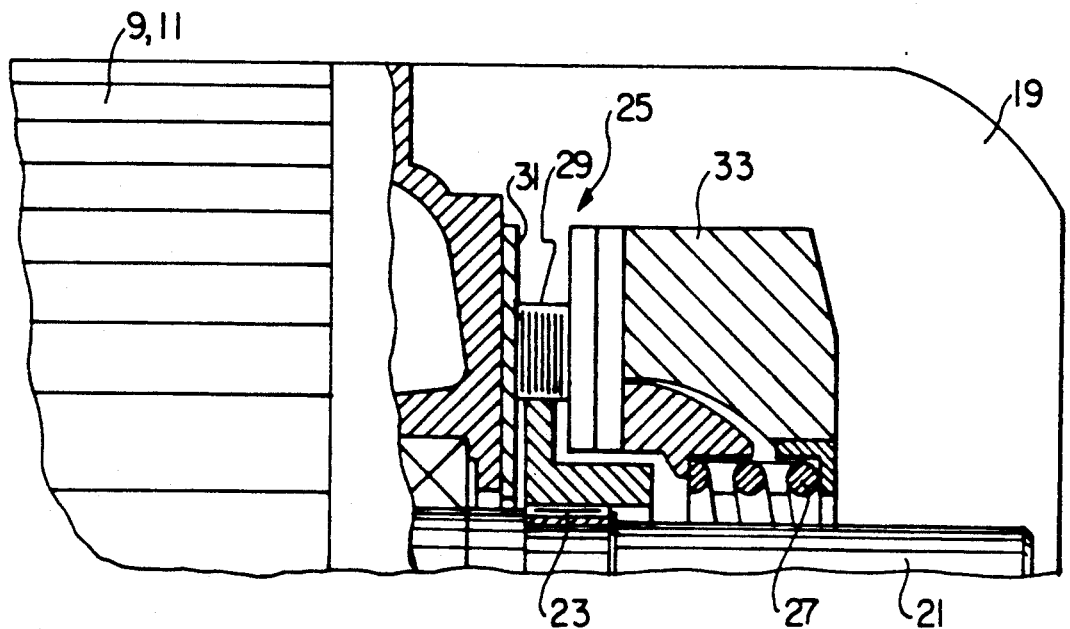

YAWING SYSTEM FOR A WIND MILL

This is a continuation-in-part of U.S. Pat. Application Ser. No. 150,770, filed Feb. 1, 1988, now U.S. Pat. No. 4,966,525.

The invention relates to a yawing system for a wind turbine the function of which is dependent on the wind direction and where the turbine part is arranged in a housing resting on a yawing bearing at the top of a tower where at least one yawing motor, which is dependent on the active state of a control system, may turn the housing relative to the tower about a substantially vertical axis via a gear assembly cooperating with the toothed rim of the yawing bearing.

Such yawing systems are generally known for controlling the rotor plane of wind turbines or wind mills in such a manner that this is generally at right angles to the wind direction. In order to keep the rotor in its position there is a self-locking gear assembly in the form of a worm gear between motor and drive gear wheel on the rim or a brake is inserted.

In the known yawing systems the drive gear wheel is kept locked by a self-locking worm gear. In such a gear system there is a comparatively high backlash. Powerful gusts of wind hitting the motor unevenly will attempt to turn the turbine part as far as the backlash permits. Then the turning is suddenly stopped by the worm gear creating uncontrolled high loads on the yawing system. This will give rise to fatigue in the gear wheel material and hence a shorter life of the gear wheels. Moreover, gusts from directions differing substantially from normal in the plane of the turbine rotor will cause very high loads on the teeth in mesh.

It is the object of the invention to provide a yawing system where there is no backlash between the toothed rim and the drive gear wheel under dynamic loads.

This is achieved by a yawing system according to the invention which is characteristic in that the yawing system comprises at least two yawing motors having each of its nonlocking gear assemblies co-operating with a yawing bearing with a control system in a passive state, such that when the wind turbine takes a desired position, the control system may control the motors to give substantially equal and, relative to the housing, mutually opposite torques.

When the yawing motors are thus kept in opposite directions of rotation and the transmissions from motor to toothed rim are not of the locking type such as worm gears, the drive teeth on the drive gear wheel will always be in mesh and turnings caused by chance gusts of wind will not make the teeth hit each other within the clearance.

When the yawing system is designed wherein each motor or in the connecting point between each motor and toothed rim, there is inserted a free wheel device between the driving shaft and a brake, which may be disengaged by the control system on account of the active state thereof, said brake being adapted to give a substantially constant braking moment opposite the free wheel direction which is equal to the direction of rotation of the motor in the passive state of the control system, yawing movements may be stopped while at the same time maintaining the above-mentioned mesh in that there is free wheeling in the same direction as the direction of rotation of the motor.

When the housing is to be yawed, the brakes are disengaged from the motors whereby the drive shafts may rotate freely opposite the directions of free wheeling. By this embodiment it is moreover possible to adjust the braking moment at such a low level that odd wind loads which would otherwise wreck rotor suspensions, gears or drive gear wheels will only cause the active brake or brakes to slip and allow the rotor to turn away from the wind. This is particularly of importance when the turbine stands on top of a hill where the wind is directed upwards and thus produces more power on the descending wing than on the ascending wing.

At the same time the gears will function as progressive dampers since the energy of the turning will go to acceleration of the inertia masses of the gear wheels.

In a preferred embodiment where the control system in its active state may control the motors in such a manner that the torques thereof operate in the same direction relative to the housing, all motors are fully utilized so that it is possible to do with comparatively small yawing motors.

It is moreover preferred that free wheel and brake act on the motor shaft, which via a planet gear may drive a cylindrical toothed wheel meshing with the toothed rim, where in its passive state the control system may supply the motors with a low electric voltage so that the torque of each motor is smaller than the braking moment, and where in its active state the control system apart from disengaging the brakes of the motors may supply the motors with a high electric voltage corresponding to normal working voltage.

Figure 2:
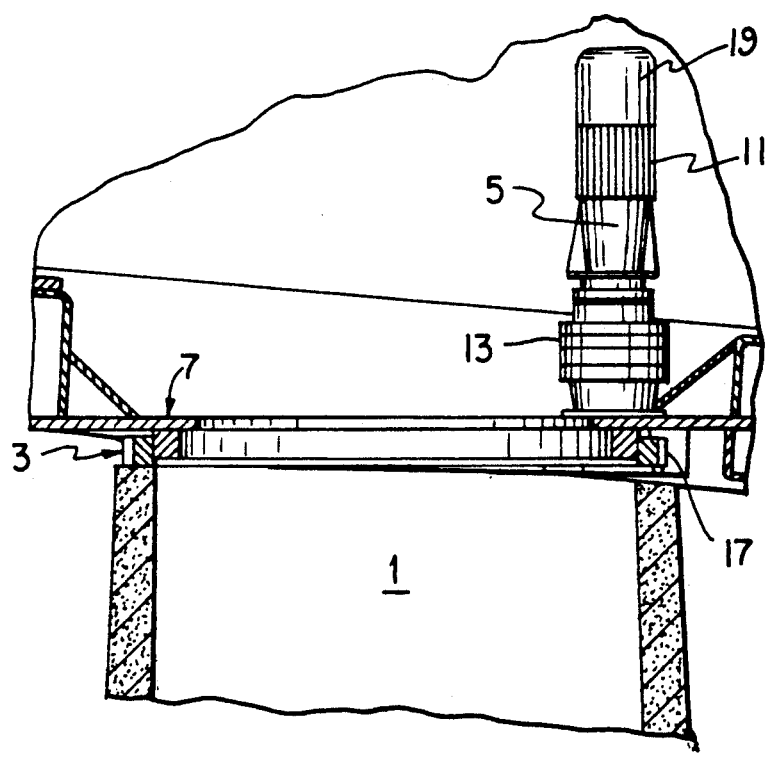

An embodiment of the invention will now be described in further detail in the following with reference to the drawing wherein FIG. 1 is a top view of a yawing bearing and two yawing motors forming part of the yawing system according to the invention, FIG. 2 is the same as shown in FIG. 1, but in sectional view along with line A-A, FIG. 3 is a sectional view of the yawing bearing along the line B-B in FIG. 1, and FIG. 4 is a partly sectional view of the rear part of a yawing motor showing the brake arrangement.

On the tower 1 of a wind mill there is secured a yawing bearing 3 supporting the base frame 7 of the generator housing (5). On the base frame 7 there are arranged two yawing motors 9 and 11 which each via a multistage planet gear 13 drives yawing wheels 15, which are in mesh with an external toothed rim 17 on the lower part of the bearing 3.

As shown by the arrows on the motors 9, 11 in FIG. 1, the motor 9 has a normal direction of rotation clockwise, i.e., free wheeling direction, and the motor 11 counter-clockwise seen from above. Under the rearmost part 19 of the motor casings a free wheel assembly 23 and an electromagnetically disengageable friction brake 25 have been arranged on the motor shafts 21. The brake 25 is of the fail-safe type, i.e., a spring 27 presses the brake block 29 against a plate 31 creating a braking moment which will only stop when current is supplied to the clutch 33. The free wheel 23 situated between the motor shaft 21 and the brake block 29 will allow the shaft 21 to turn freely in its normal direction of rotation independently of the brake 25.

A not shown control system controls the clutches 33 of the brakes 25 and supplies current to the motors 9, 11. The control system keeps and rotor plane and thus the longitudinal axis of the generator housing 5 in a position against the wind direction and has two operational states: an active and a passive state. The yawing system can be said to have the following modes of operation:

a) Passive state, the generator housing 5 is kept still:

The yawing motors 9 and 11, which are asynchronous motors, are supplied from electric low-tension mains with a voltage in such a manner that they give mutually opposite torques. No current is supplied to the clutches 33. The motor 9 gives a torque counter-clockwise which is smaller than the braking moment of a brake 25 on the motor 11 and a similarly small torque is given by the motor 11. The yawing wheels 15 of the motors will firmly join the toothed rim 17 and at the same time the bigger braking moments will ensure a stable equilibrium in its position.

b) Passive state, the generator housing 5 is exposed to a torque about the yawing axis by an odd wind load close to the load limit of the mill structure:

The turning torque will exceed the braking moments and the generator housing 5 will turn about the yawing axis until the rotor has turned so far that the moments caused by the wind are smaller than the braking moments. The control systems will stay passive until the housing 5 is to be turned to the wind again.

c) Active state, the generator housing 5 being turned:

Both brakes 25 are disconnected and both motors 9, 11 are supplied with normal working voltage in such a manner that the yawing wheels 15 thereof give their torques in the same direction. The signal for active state comes from an electronic anemoscope.

In the described embodiment use is made of electrical motors and an electrical control system but other solutions such as hydraulic ones are conceivable within the scope of the invention.

We claim:

1. A yawing system for a wind turbine, the operation of said turbine being dependent on the wind direction, wherein the turbine is in a housing resting on a yawing bearing at the top of a tower, comprising at least two yawing motors for turning the housing relative to the tower about a substantially vertical axis via a gear assembly co-operating with a toothed rim of the yawing bearing, said motor responding to a control system, said at least two yawing motors each having a non-locking gear assembly co-operating with the yawing bearing for turning said housing, the control system in a passive state with the wind turbine at a desired position, controlling said motors to give substantially equal and, relative to the housing, mutually opposite torques, in one of each motor and in the connecting point between each motor and toothed rim a free wheel device between a driving shaft of the motor and a brake, said shaft being subject to disengagement by the control system in the active state thereof, said brake being adapted to give a substantially constant braking moment opposite the free wheel direction.

2. A yawing system according to claim 1, wherein in its active state the control system controls the motors such that the torques thereof operate in the same direction relative to the housing.

3. A yawing system according to claim 1, characterized in that said free wheel device and brake act on the motor shaft, which via a planet gear drives a cylindrical toothed wheel meshing with the toothed rims, where in its passive state the control system supplies the motors with a low electric voltage so that the torque of each motor is smaller than the braking moment of said brake, and where in its active state the control system disengages the brakes of the motors and supplies the motors with a high electric voltage corresponding to a normal working voltage.

4. A yawing system according to claim 2, wherein said free wheel and brake act on the motor shaft, which via a planet gear drives a cylindrical toothed wheel meshing with the toothed rim, where in its passive state the control system supplies the motors with a low electric voltage so that the torque of each motor is smaller than the braking moment of said brake, and where in its active state the control system disengages the brakes of the motors and supplies the motors with a high electric voltage corresponding to a normal working voltage.

* * * * *